(No Model.)

H. H. BARRY & W. JAMES.
DIVIDED HOUSEHOLD UTENSIL.

No. 471,517. Patented Mar. 22, 1892.

Witnesses
E. J. Hussey
W. Harvey Muzzy

Inventors
H. H. Barry & W. James
By their Attorneys
Alexander & Davis

THE NORRIS PETERS CO., PHOTO-LITHO., WASHINGTON, D. C.

UNITED STATES PATENT OFFICE.

HENRY HEATON BARRY AND WILLIAM JAMES, OF PHILADELPHIA, PENNSYLVANIA, ASSIGNORS TO THE BARRY & JAMES MANUFACTURING COMPANY, OF NEW JERSEY.

DIVIDED HOUSEHOLD UTENSIL.

SPECIFICATION forming part of Letters Patent No. 471,517, dated March 22, 1892.

Application filed October 16, 1891. Serial No. 408,966. (No model.)

*To all whom it may concern:*

Be it known that we, HENRY HEATON BARRY and WILLIAM JAMES, citizens of the United States, residing in Philadelphia, in the county of Philadelphia and State of Pennsylvania, have invented a new and useful Improvement in Household Utensils, of which the following is a specification.

Our invention relates especially to that class of pots, pails, wash-boilers, and other household utensils having their interior divided off by vertical partitions into two or more compartments, so that (in cooking-vessels) a number of articles of food can be cooked in one vessel at the same time and yet retain their individual flavor; and it consists of certain novel features of construction that are fully hereinafter set forth, and particularly pointed out in the claims.

Figure 1:
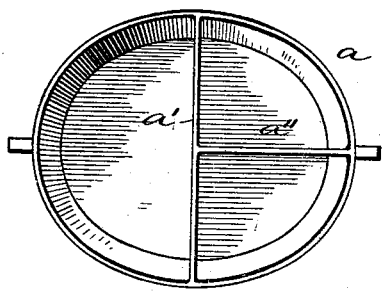
Figure 2:
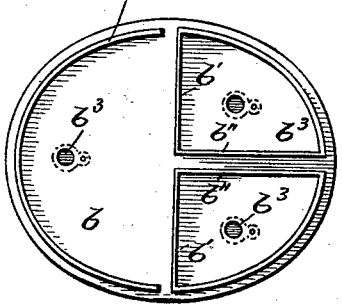
Figure 3:
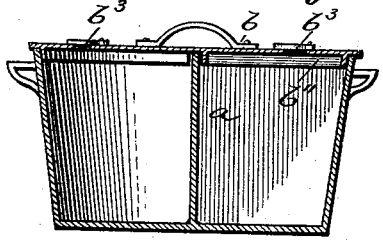
Figure 4:
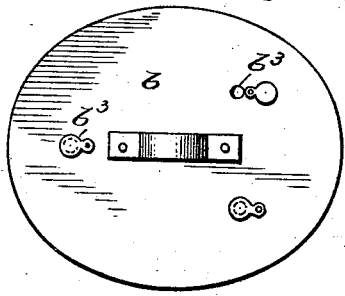
Figure 5:
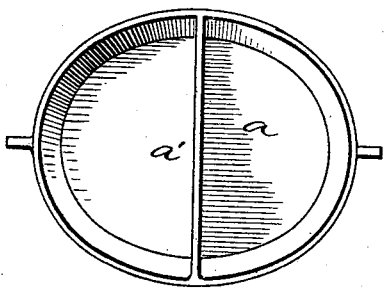

In the accompanying drawings, Figure 1 represents a plan view of a pot constructed according to our invention; Fig. 2, a view of the under side of the cover removed; Fig. 3, a vertical sectional view of the pot provided with the cover; Fig. 4, a detail plan of the cover; Fig. 5, a plan of a vessel divided into but two compartments, and Fig. 6 a view of the under side of its cover.

We have shown the invention applied to pots in the drawings; but it is evident that it is equally applicable to other household utensils, such as wash-boilers, buckets, cans, &c.

In the drawings, $a$ designates a cast pot having formed integral with it a transverse partition $a'$, which divides the interior of the pot into two main compartments, and another partition $a''$, extending from the middle of this partition to the adjacent wall of the pot, which latter partition subdivides one of said main compartments into two smaller compartments. These partitions may be cast integral with the vessel, or they may be inserted and secured therein in any suitable manner, and their upper edges preferably terminate flush with the upper edge of the vessel. A cover $b$ is fitted on the vessel and provided with a rim or flange $b'''$ on its under side, near its edge, which fits closely against the interior of the upper edge of the vessel and makes a close joint therewith, said flange being cut away where it intersects the edges of the partitions. The under side of the cover is provided with depending flanges $b'$ and $b''$, which fit against and closely embrace the upper edges of the partitions in the vessel, so that during the process of cooking steam and vapor cannot pass from one compartment to another and intermingle the several flavors of the articles cooking. These flanges are connected rigidly together at points where they touch, so as to brace each other and strengthen the cover. An adjustable valve $b^3$ is secured over an opening in the cover over each compartment, so that the escape of steam from each compartment may be regulated independently.

The cover and vessel are to be provided with suitable handles and bails, as is evident.

Figure 6:
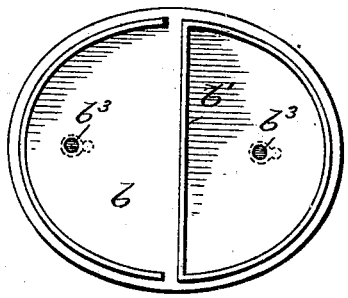

In Figs. 5 and 6 we show our invention applied to vessels having but two compartments, it being evident that the invention is applicable to vessels having two compartments, as well as those having three or more.

Having thus fully described our invention, what we claim, and desire to secure by Letters Patent, is—

1. The combination of a vessel having its interior divided into two or more compartments by vertical partitions, and a single cover provided with depending flanges fitting closely against the upper edges of the partitions, as and for the purpose described.

2. The combination of a vessel having its interior divided into two or more compartments, a cover provided with depending flanges $b'$ $b''$ $b'''$, fitting closely within the vessel and embracing the upper edges of its partitions, and a valved opening formed in the cover over each of said compartments, substantially as described.

HENRY HEATON BARRY.
WILLIAM JAMES.

Witnesses:
DANIEL HART,
WILLIAM J. LOUGHERY.